(12) United States Patent
Izumiya et al.

(10) Patent No.: US 12,157,085 B2
(45) Date of Patent: Dec. 3, 2024

(54) FILTER PACK AND AIR FILTER

(71) Applicant: NIPPON MUKI CO., LTD., Tokyo (JP)

(72) Inventors: Hirokazu Izumiya, Yuki (JP); Osamu Kitagawa, Yuki (JP); Shiro Hayashi, Yuki (JP)

(73) Assignee: NIPPON MUKI CO., LTD., Tokyo (JP)

( * ) Notice: Subject to any disclaimer, the term of this patent is extended or adjusted under 35 U.S.C. 154(b) by 806 days.

(21) Appl. No.: 17/286,417

(22) PCT Filed: Jun. 6, 2019

(86) PCT No.: PCT/JP2019/022555
§ 371 (c)(1),
(2) Date: Apr. 16, 2021

(87) PCT Pub. No.: WO2020/079882
PCT Pub. Date: Apr. 23, 2020

(65) Prior Publication Data
US 2021/0387128 A1 Dec. 16, 2021

(30) Foreign Application Priority Data
Oct. 17, 2018 (JP) .................. 2018-196227

(51) Int. Cl.
*B01D 46/10* (2006.01)
*B01D 46/52* (2006.01)

(52) U.S. Cl.
CPC ........... *B01D 46/523* (2013.01); *B01D 46/10* (2013.01); *B01D 46/522* (2013.01)

(58) Field of Classification Search
CPC .... B01D 46/10; B01D 46/522; B01D 46/523; B01D 46/0001; B01D 46/00; B01D 46/52
(Continued)

(56) References Cited

U.S. PATENT DOCUMENTS 3,871,851 A 3/1975 Neumann
3,914,116 A * 10/1975 Westlin .................. B01D 46/10
                                                                210/493.1
(Continued)

FOREIGN PATENT DOCUMENTS

EP        0 347 188 A2   12/1989
JP          2-43906 A     2/1990
(Continued)

OTHER PUBLICATIONS

European Search Report of corresponding EP Application No. 19 87 3199.4 dated Apr. 5, 2022.
(Continued)

*Primary Examiner* — Minh Chau T Pham
(74) *Attorney, Agent, or Firm* — Global IP Counselors, LLP

(57) ABSTRACT

A filter pack includes a pleated filter medium and spacing members that maintain a distance between adjacent mountain or valley folded portions of the filter medium. The filter medium includes pairs of extension portions that extend to both sides of folds of the filter medium and face each other when filter medium is folded. The plurality of spacing members include paired spacing members that are respectively provided on the extension portions so as to linearly extend in a direction that is orthogonal to the folds. The paired spacing members are in contact with each other when the filter medium is folded. Surfaces of the paired spacing members that come into contact with each other each include a flat surface that extends in a direction that is orthogonal to a direction in which the spacing members face each other when viewed along an extending direction of the spacing members.

17 Claims, 6 Drawing Sheets

(58) Field of Classification Search
USPC .................................................. 55/521, 498
See application file for complete search history.

(56) References Cited

U.S. PATENT DOCUMENTS

| | | | |
|---|---|---|---|
| 5,084,178 A | | 1/1992 | Miller et al. |
| 5,914,414 A | | 6/1999 | Taomo et al. |
| 2012/0180664 A1 | * | 7/2012 | Lundquist ............ B01D 46/523 55/499 |
| 2016/0067647 A1 | * | 3/2016 | Tate ....................... B01D 46/10 156/219 |
| 2023/0182059 A1 | * | 6/2023 | Horiye ............... B01D 46/0001 55/521 |
| 2023/0241541 A1 | * | 8/2023 | Seeberger ............... D04H 1/559 55/521 |

FOREIGN PATENT DOCUMENTS

| | | |
|---|---|---|
| JP | 2-229509 A | 9/1990 |
| JP | 10-216445 A | 8/1998 |
| JP | 11-42411 A | 2/1999 |
| JP | 11-253719 A | 9/1999 |
| JP | 2001-524373 A | 12/2001 |
| JP | 2004-321937 A | 11/2004 |
| JP | 2007-98233 A | 4/2007 |
| JP | 2008-212781 A | 9/2008 |
| JP | 2009-11887 A | 1/2009 |
| JP | 2014-64995 A | 4/2014 |
| JP | 2014-198313 A | 10/2014 |
| JP | 2015-107482 A | 6/2015 |
| WO | 99/28012 A1 | 6/1999 |
| WO | 2018/062194 A1 | 4/2018 |

OTHER PUBLICATIONS

International Search Report of corresponding PCT/JP2019/022555 dated Sep. 10, 2019.

* cited by examiner

FILTER PACK AND AIR FILTER

CROSS-REFERENCE TO RELATED APPLICATIONS

This U.S. National stage application claims priority under 35 U.S.C. § 119 (a) to Japanese Patent Application No. 2018-196227, filed in Japan on Oct. 17, 2018, the entire contents of which are hereby incorporated herein by reference.

BACKGROUND

Field of the Invention

The present invention relates to a filter pack that includes a pleated filter medium, and an air filter.

Background Information

A filter medium used in an air filter that collects fine particles such as dust floating in the air is sometimes pleated so as to have a zigzag shape in order to increase the area of the filter medium that can collect fine particles. In order to maintain distance between adjacent pleats, the pleated filter medium is provided with a plurality of spacing members called spacers that extend linearly, for example. In a state where the filter medium provided with the spacers is folded into a zigzag shape, adjacent spacers are in contact with each other and the distance between pleats of the folded filter medium is kept uniform. As a result, a situation in which airflow is locally hindered is suppressed, and an increase in pressure loss is suppressed.

There is a conventionally known filter medium provided with spacers that are provided by applying a hot-melt adhesive, which is the material that forms the spacers, in a melted state to the filter medium, folding the filter medium while the hot-melt adhesive is still soft, and joining mutually facing hot-melt adhesive (JP 2014-198313A).

SUMMARY

However, in the case of the filter medium provided with the spacers described above, it is necessary to accurately fold the filter medium while checking positions of the hot-melt adhesive so that the softened hot-melt adhesive are not joined in a state of being displaced from each other when the filter medium is folded. This is a troublesome work.

An object of the present invention is to provide a filter pack and an air filter that make it possible to easily fold a pleated filter medium and stably maintain distance between pleats of the filter medium.

One aspect of the present invention is a filter pack including:
 a filter medium that is configured to collect fine particles in a gas and that a pleating is performed such that mountain folds and valley folds are alternately repeated; and
 a plurality of spacing members that maintain a distance between adjacent mountain-folded portions or adjacent valley-folded portions of the filter medium, wherein
 the filter medium includes two extension portions that extend to both sides of folds of the filter medium that are formed through the pleating, the extension portions facing each other in a state where the filter medium is folded,
 the plurality of spacing members include paired spacing members that are respectively provided on the extension portions so as to linearly extend in a direction that is orthogonal to the folds,
 the paired spacing members are in contact with each other in the state where the filter medium is folded, and
 surfaces of the paired spacing members that come into contact with each other each include a flat surface that extends in a direction that is orthogonal to a direction in which the spacing members face each other when viewed in an extending direction of the spacing members.

When viewed in the extending direction of the spacing members, a width of each of the spacing members along a direction that is parallel to an extending direction of the flat surface of the spacing member is preferably maximum at a bottom surface of the spacing member that is in contact with the filter medium.

It is preferable that in the direction that is parallel to the extending direction of the flat surface, a located position of the flat surface is within the range of a located position of the bottom surface, and the width of the spacing member that includes the flat surface becomes shorter in a direction away from the bottom surface.

Preferably, the paired spacing members each further include two flat side surfaces that each connect an end of a bottom surface of the spacing member that is in contact with the filter medium and an end of the flat surface, the ends being ends in a direction that is parallel to an extending direction of the flat surface.

In a direction that is parallel to an extending direction of the flat surface, a ratio W1/W2 of a width W1 of the flat surface to a width W2 of a bottom surface of the paired spacing member that is in contact with the filter medium is preferably 0.3 to 0.9.

A ratio H/W2 of a height H of the flat surface with respect to a bottom surface of the paired spacing member that is in contact with the filter medium to a width W2 of the bottom surface in a direction that is parallel to an extending direction of the flat surface is preferably larger than 0.5.

Ends of the paired spacing members on a fold side in the extending direction of the spacing members are preferably spaced apart from the fold.

It is preferable that a surface of a first spacing member of the paired spacing members that comes into contact with a second spacing member further includes a protruding portion that is surrounded by the flat surface of the first spacing member and protrudes from the flat surface in a direction away from the filter medium, and
 a surface of the second spacing member that comes into contact with the first spacing member further includes a recessed portion that is surrounded by the flat surface of the second spacing member and receives the protruding portion.

Another aspect of the present invention is a filter pack including:
 a filter medium that is configured to collect fine particles in a gas and that a pleating is performed such that mountain folds and valley folds are alternately repeated; and
 a plurality of spacing members that maintain a distance between adjacent mountain-folded portions or adjacent valley-folded portions of the filter medium, wherein
 the filter medium includes two extension portions that extend to both sides of folds of the filter medium that are formed through the pleating, the extension portions facing each other in a state where the filter medium is folded, the plurality of spacing members include paired spacing members that are respectively provided on the extension portions, the paired spacing members are in contact with each other in the state where the filter medium is folded, a surface of a first spacing member of the paired spacing members that comes into contact with a second spacing member includes a protruding portion that protrudes in a direction away from the filter medium, and a surface of the second spacing member that comes into contact with the first spacing member includes a recessed portion that receives the protruding portion.

Another aspect of the present invention is an air filter including:

the above-described filter pack; and a frame body that surrounds the filter pack such that folds of the filter medium of the filter pack are arranged on an upstream side and a downstream side of a direction in which an airflow passes through the filter medium.

According to the present invention, it is possible to easily fold the pleated filter medium and stably maintain distance between pleats of the filter medium.

DETAILED DESCRIPTION OF EMBODIMENT(S)

The following describes an air filter and a filter pack according to the present embodiment. The present embodiment encompasses various embodiments described later.

Figure 1:
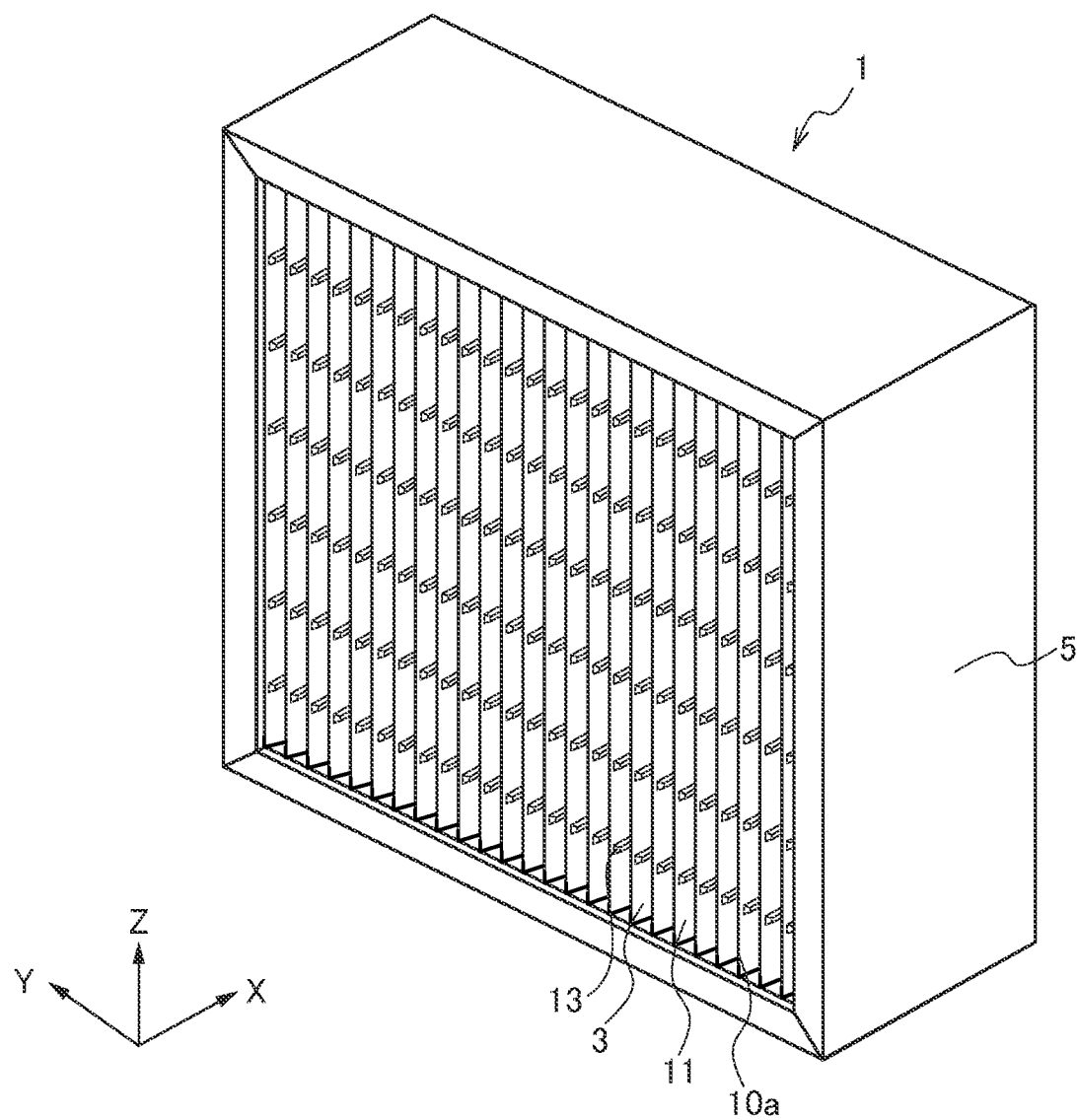
FIG. 1 is an external perspective view showing an air filter according to an example of the present embodiment.

FIG. 1 is an external perspective view showing an air filter 1 according to an example of the present embodiment.

The air filter 1 includes a filter pack 3 and a frame body 5.

Figure 2:
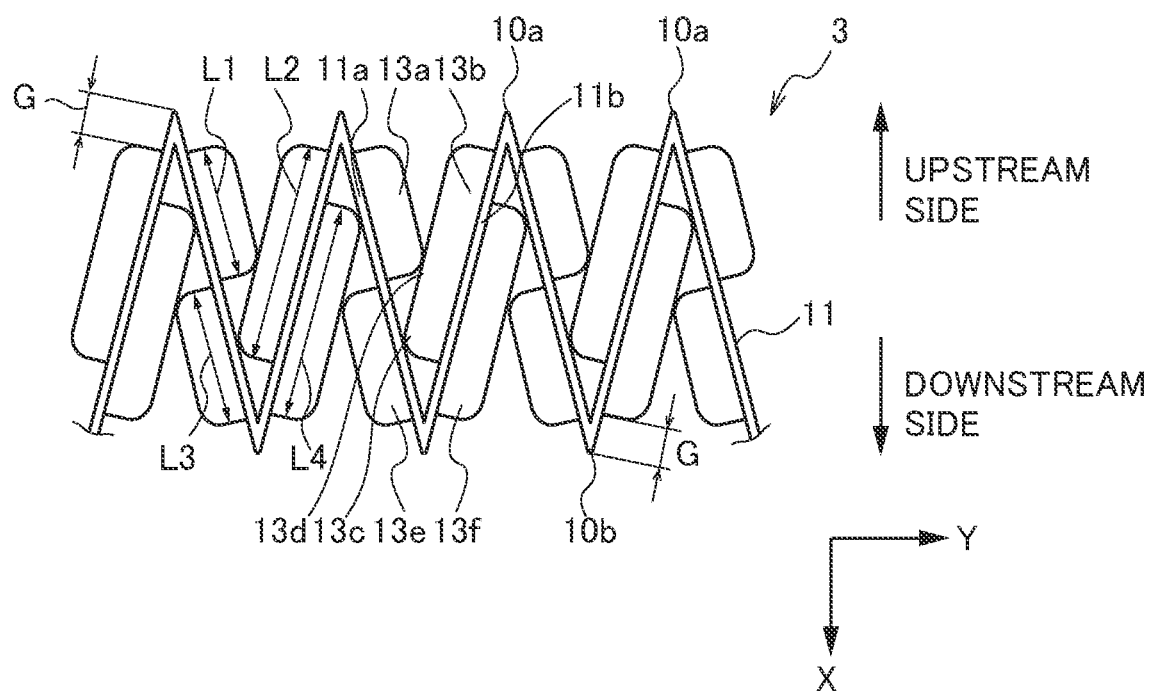
FIG. 2 is a diagram showing a portion of a folded filter pack.

FIG. 2 is a diagram showing a portion of the filter pack 3 that is folded and viewed in a direction in which folds 10a and 10b of pleats extend.

The filter pack 3 includes a filter medium 11 and a plurality of spacing members 13.

The filter medium 11 is a member that collects fine particles in a gas. The filter medium 11 is used to remove powder dust that has a particle size of no greater than 2.5 µm and a concentration of no greater than 0.3 mg/m$^3$, for example, and has a collecting efficiency of at least 80% when measured using a counting method, a pressure loss of 79 to 493 Pa, and a dust holding capacity (dust holding amount) of 200 to 800 g/m$^2$, for example. In the counting method, measurement is performed by passing air that contains particles of lithometeor, polyalphaolefin (PAO), or silica that have a particle size of 0.3 µm. The dust holding capacity refers to the amount of powder dust that is collected before the filter reaches a predetermined final pressure loss. The filter medium 11 may be a filter medium for an HEPA filter, a filter medium for a ULPA filter, or a filter medium for a gas removal filter, for example.

The filter medium 11 is a fiber body that is constituted by glass fiber, organic fiber, or mixture of glass fiber and organic fiber, for example, and is a non-woven fabric or felt, for example. A filter medium 11 that is constituted by glass fiber is manufactured through papermaking using a wet method or a dry method, for example. A filter medium 11 that is constituted by organic fiber is manufactured using a spun bonding method, a melt blowing method, a thermal bonding method, or a chemical bonding method, for example. The filter medium 11 may also be manufactured by layering a plurality of non-woven fabrics that have different collecting efficiencies, for example.

The filter medium 11 is pleated such that mountain folds and valley folds are alternately repeated as shown in the drawing. Pleating is performed using a reciprocating folding machine or a rotary folding machine. As a result of being pleated, the filter medium 11 includes a plurality of mountain folds 10a and a plurality of valley folds 10b that are parallel to each other. The filter medium 11 includes pairs of extension portions 11a and 11b that extend to both sides of each of the folds 10a and 10b. That is, the extension portions 11a and the extension portions 11b are alternately arranged in a direction in which the pleats are arranged. The extension portions 11a and the extension portions 11b face each other in a state where the filter medium 11 is folded.

The spacing members 13 are members that maintain a distance between pleats of the filter medium 11. The spacing members 13 are formed of a thermoplastic resin that is called a hot-melt adhesive, for example. Examples of such thermoplastic resins include polyamide-based thermoplastic resin, urethane-based thermoplastic resin, olefin-based thermoplastic resin, and polyolefin-based thermoplastic resin.

The plurality of spacing members 13 include paired spacing members 13a and 13b that are respectively provided on the extension portions 11a and 11b so as to extend linearly. In the example shown in FIGS. 1 and 2, the plurality of spacing members 13 include multiple pairs of spacing members 13a and 13b. More specifically, the spacing members 13a and 13b are formed on a surface of the filter medium 11 so as to linearly extend along a direction that is orthogonal to the folds 10a and 10b of the filter medium 11. With this configuration, the spacing members 13a and 13b come into contact with each other in a state where the filter medium 11 is folded.

Figure 3:
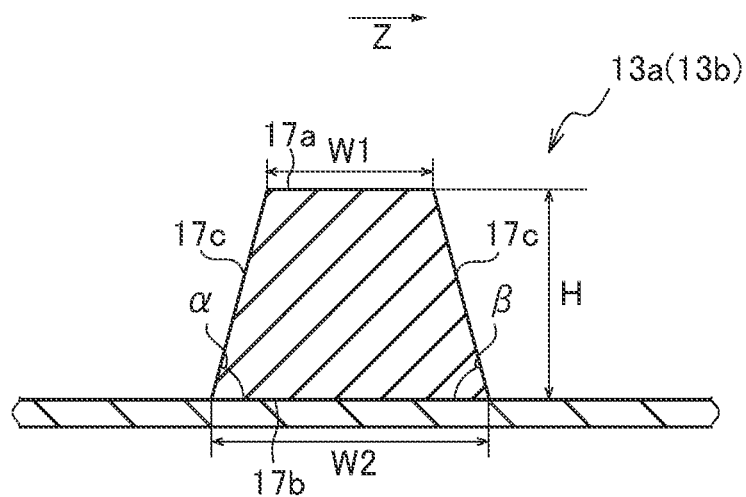
FIG. 3 is a diagram showing a cross-sectional shape of a linear protrusion.

FIG. 3 is a diagram showing a cross-sectional shape of the spacing member 13a or 13b that is cut along an imaginary plane that is orthogonal to an extending direction of the spacing member (a depth direction with respect to the sheet face).

As shown in FIG. 3, surfaces (hereinafter also referred to as "contact surfaces") of the spacing members 13a and 13b that come into contact with each other each include a flat surface 17a that extends in a direction (left-right direction in FIG. 3) that is orthogonal to a direction (up-down direction in FIG. 3) in which the spacing members 13a and 13b face each other when viewed in the extending direction of the spacing members 13a and 13b. The spacing members 13a and 13b each have such a specific configuration and are each formed of a holt-melt adhesive that is in a solidified state, for example. If the hot-melt adhesive is in a softened state, the cross-sectional shape is rounded due to surface tension, the flat surface is not formed, and the spacing members do not have surfaces that come into contact with each other. Note that the solidified state refers to a state of not reaching the softening point of the thermoplastic resin that is the material of the spacing members 13a and 13b. That is, the spacing members 13a and 13b do not have fluidity. In the present embodiment, the spacing members 13a and 13b are in the solidified state and include the contact surfaces, and accordingly, when the filter medium is folded, portions of the holt-melt adhesive are not joined in a state of being displaced from each other as is the case where softened hot-melt adhesive are joined, and even if the spacing members 13a and 13b are displaced when brought into contact with each other, the spacing members 13a and 13b can be separated from each other by sliding the spacing members 13a and 13b relative to each other along the flat surfaces 17a, or spreading open the folded filter medium 11, and then the filter medium 11 can be folded again. Therefore, positions of the spacing members 13a and 13b coming into contact with each other need not be checked when the filter medium 11 is folded, and the filter medium 11 can be easily folded. Note that displacement refers to displacement in a width direction (Z direction) of the spacing members 13a and 13b. Such displacement is likely to occur when an external force including a component that presses the spacing members 13a and 13b against each other acts on the filter pack 3 when the air filter 1 is assembled, for example. According to one embodiment, the flat surface 17a is preferably a smooth surface. Also, the flat surface 17a may also be provided only in a portion of the contact surface in the width direction (Z direction) of the spacing members 13a and 13b, but according to one embodiment, the flat surface 17a is preferably provided in the entire region of the contact surface in the width direction (Z direction) of the spacing members 13a and 13b.

Also, in the present embodiment, the flat surface 17a extends in the direction orthogonal to the direction in which the spacing members 13a and 13b face each other, as described above. Therefore, even if an external force including a component that presses the spacing members 13a and 13b against each other acts on the filter pack 3 in a state where the filter medium 11 is folded and the contact surfaces of the spacing members 13a and 13b slide sideways and are displaced, distance is maintained between the two mutually facing extension portions 11a and 11b. Thus, the distance between pleats of the filter medium 11 is stably maintained.

Figure 6:
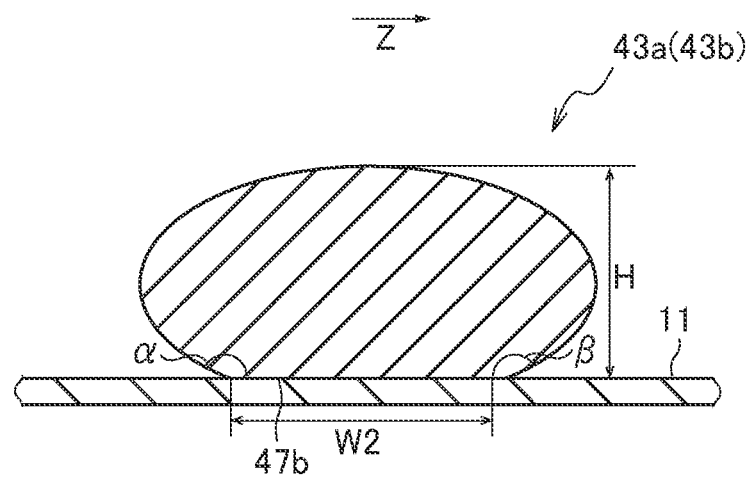
FIG. 6 is a diagram showing a cross-sectional shape of a linear protrusion according to a comparative example.

In contrast, if paired spacing members each have a curved cross-sectional shape that has a cross-sectional contour such as an elliptical arc or a circular arc as in the example shown in FIG. 6, when an external force including a component that presses the spacing members against each other acts on the filter pack in a state where the filter medium is folded and the spacing members slide sideways and are displaced, the distance between the mutually facing extension portions 11a and 11b is reduced. If such a place exists in the folded filter pack, the distance between pleats becomes not uniform and airflow is difficult to flow in that place. As a result, the pressure loss is likely to increase. FIG. 6 is a diagram showing a cross-sectional shape of spacing members 43a and 43b according to a comparative example, which will be described later.

As described above, the filter pack 3 according to the present embodiment makes it possible to easily fold the pleated filter medium 11 and stably maintain the distance between pleats of the filter medium 11.

Furthermore, in the present embodiment, the spacing members 13a and 13b include the contact surfaces and are in the solidified state as described above, and therefore the spacing members 13a and 13b do not deform when pressed against each other, and the area of contact between the filter medium 11 and the spacing members 13a and 13b does not vary. Accordingly, the area (filter medium area) of the filter medium 11 in which fine particles can be collected is not reduced, and a reduction in the lifetime of the filter medium 11 can be suppressed.

Here, it is preferable that the extension portions 11a and 11b of the filter medium 11 form a V-shape as shown in FIG. 2 when viewed in the direction of the folds 10a and 10b, from the standpoint of suppressing an increase in the pressure loss of an airflow that passes through the filter medium 11. However, in the case of the above-described filter medium provided with the spacers described in Patent Literature 1, linearly applied hot-melt adhesive are joined to each other in the softened state, and accordingly, when the V-shape is to be formed, the hot-melt adhesive spread in the width direction and the area of contact between the hot-melt adhesive and the filter medium is increased, because the distance between the mutually facing extension portions 11a and 11b is short at a position near a tip end portion (valley-folded portion) of the V-shape. Consequently, the filter medium area decreases and the lifetime of the filter medium 11 is shortened.

Note that, regarding the flat surface 17a, the direction that is orthogonal to the direction in which the spacing members face each other refers to a direction that is parallel to the extending direction of bottom surfaces of the spacing members 13a and 13b that are in contact with the filter medium 11 when viewed in the extending direction of the spacing members 13a and 13b, or a direction that intersects with the parallel direction and forms a minor angle no greater than 10° or preferably no greater than 5° with the parallel direction.

The spacing members 13a and 13b in the present embodiment can be manufactured using a transfer method, for example. More specifically, the spacing members are manufactured by applying the hot-melt adhesive that is heated and softened to a groove that is provided in the surface of a jig, bringing the jig into contact with the filter medium 11 such that the surface faces the filter medium 11 to make the hot-melt adhesive in the groove adhere to the filter medium 11, and thereafter separating the jig from the filter medium 11 to provide (transfer) the hot-melt adhesive on the filter medium 11. The shape of the groove in the jig is adjusted according to the cross-sectional shape of the spacing members 13a and 13b. Specifically, a bar-shaped, plate-shaped member or the like that includes a flat surface in which the groove is provided or a cylindrical member (roller) that includes an outer peripheral surface in which the groove is provided can be used as the jig.

According to one embodiment, it is preferable that the width of each of the spacing members 13a and 13b in a direction (Z direction) that is parallel to the extending direction of the flat surface 17a is maximum at a bottom surface 17b. If the height position (maximum-width position) at which the spacing members 43a and 43b have the maximum width is not at a bottom surface 47b as in the example shown in FIG. 6, out of airflows that pass through the filter medium 11, airflows along the spacing members 43a and 43b are interrupted by portions of the spacing members 43a and 43b at the maximum-width position and are difficult to flow to spaces below the portions (on the bottom surface 47b side). If there are such places in which airflows are difficult to flow, the pressure loss is likely to increase.

According to one embodiment, it is preferable that, in the direction (Z direction) that is parallel to the extending direction of the flat surface 17a, the location of the flat surface 17a (location in the Z direction indicated with a reference sign W1 in FIG. 3) is within the range of the location of the bottom surface 17b (location in the Z direction indicated with a reference sign W2 in FIG. 3) as shown in FIG. 3, and the width of each of the spacing members 13a and 13b becomes shorter in a direction away from the bottom surface 17b. The spacing members 13a and 13b having such a cross-sectional shape have the maximum-width position at the bottom surface 17b and do not include portions that protrude outward from the arrangement range of the bottom surface 17b in the Z direction (i.e., leftward or rightward from the range indicated with the reference sign W2 in FIG. 3), and therefore airflows that pass through the filter medium 11 along the spacing members 13a and 13b are unlikely to be hindered at positions above the bottom surface 17b. Therefore, an increase in the pressure loss is suppressed.

According to one embodiment, it is preferable that the spacing members 13a and 13b each further include two flat side surfaces 17c that each connect an end of the bottom surface 17b of the spacing member 13a or 13b that is in contact with the filter medium 11 and an end of the flat surface 17a, the ends being ends in the direction (Z direction) that is parallel to the extending direction of the flat surface 17a as shown in FIG. 3. That is, the cross-sectional shapes of the spacing members 13a and 13b are preferably trapezoidal shapes. If the spacing members 13a and 13b have such a configuration, airflows along the spacing members 13a and 13b are unlikely to be hindered by the side surfaces 17c, and an increase in the pressure loss is suppressed.

Figure 4:
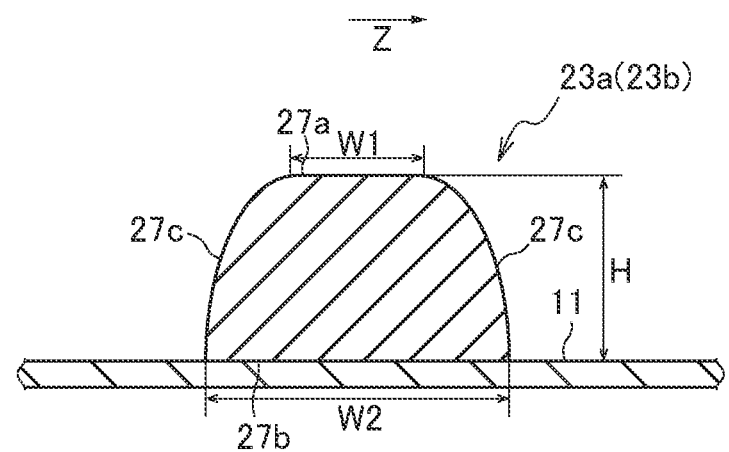
FIG. 4 is a diagram showing a cross-sectional shape of a linear protrusion according to a variation.
Figure 5:
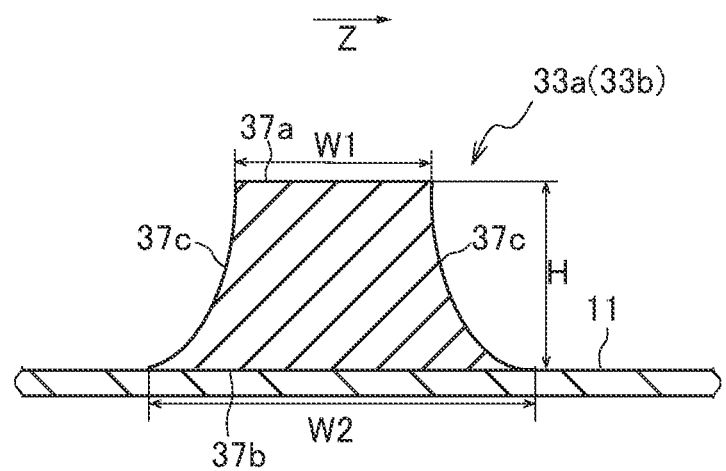
FIG. 5 is a diagram showing a cross-sectional shape of a linear protrusion according to a variation.

Here, variations of the spacing members 13a and 13b will be described with reference to FIGS. 4 and 5. FIGS. 4 and 5 are diagrams showing cross-sectional shapes of spacing members according to the variations.

Spacing members 23a and 23b shown in FIG. 4 each include a flat surface 27a that is parallel to a bottom surface 27b and further include curved side surfaces 27c that connect respective ends of the bottom surface 27b and the flat surface 27a. More specifically, the side surfaces 27c have shapes that bulge outward (away from the center of the cross-sectional shape) when compared to a flat surface that connects respective ends of the bottom surface 27b and the flat surface 27a. It was found that the spacing members 23a and 23b having such a cross-sectional shape can be easily separated from the groove provided in the above-described jig when the spacing members are manufactured using a transfer method.

Spacing members 33a and 33b shown in FIG. 5 each include a flat surface 37a that is parallel to a bottom surface 37b and further include curved side surfaces 37c that connect respective ends of the bottom surface 37b and the flat surface 37a. More specifically, the side surfaces 37c have shapes that bulge inward (toward the center of the cross-sectional shape 37) when compared to a flat surface that connects respective ends of the bottom surface 37b and the flat surface 37a. It was found that the spacing members 33a and 33b having such a cross-sectional shape have an enhanced effect of suppressing an increase in the pressure loss, when compared to the spacing members 13a and 13b shown in FIG. 3.

According to one embodiment, a ratio W1/W2 of a width W1 of the flat surface 17a to a width W2 of the bottom surface 17b in the direction (Z direction) that is parallel to the extending direction of the flat surface 17a is preferably 0.3 to 0.9 as shown in FIG. 3. If the ratio W1/W2 is smaller than 0.3, the distance between the mutually facing extension portions 11a and 11b is likely to decrease when the spacing members 13a and 13b that are in contact with each other are displaced from each other. On the other hand, if the ratio W1/W2 is larger than 0.9, the flat surface 17a is too long relative to the bottom surface 17b, and airflows along the spacing members 13a and 13b are likely to be disturbed as a result of hitting both end portions of the flat surface 17a, and the pressure loss is likely to increase. The ratio W1/W2 is preferably 0.4 to 0.8, and more preferably 0.5 to 0.7.

According to one embodiment, a ratio H/W2 of a height H of the flat surface 17a from the bottom surface 17b to the width W2 of the bottom surface 17b in the direction (Z direction) that is parallel to the extending direction of the flat surface 17a is preferably larger than 0.5 as shown in FIG. 3. If the ratio H/W2 is larger than 0.5, the area of contact between the filter medium 11 and the spacing members 13a and 13b can be made small to secure the filter medium area, and airflows along the spacing members 13a and 13b are unlikely to be hindered and an increase in the pressure loss is suppressed. The ratio H/W2 is preferably larger than 0.8, and more preferably larger than 1. Note that, if the ratio H/W2 is too large, the distance between the extension portions 11a and 11b may decrease when the spacing members 13a and 13b that are in contact with each other are displaced from each other, and therefore the ratio H/W2 is preferably not larger than 2.

According to one embodiment, in the case where the cross-sectional shapes of the spacing members 13a and 13b are trapezoidal shapes, two base angles α and β that are formed between the bottom surface 17b and the side surfaces 17c are each preferably 65° to 85°. If the base angles α and β are in the above-described range, the above-described effect of suppressing an increase in the pressure loss can be easily achieved while the filter medium area is secured. From the standpoint of making airflows along both side surfaces 17c of the spacing members 13a and 13b uniform and suppressing an increase in the pressure loss, the two base angles α and β are preferably the same as each other.

The following are specific examples of preferable dimensions of the spacing members 13a and 13b.

The width W1 of the flat surface 17a is 1 to 5 mm.

The width W2 of the bottom surface 17b is 2 to 10 mm.

The height H of the flat surface 17a from the bottom surface 17b is 1.5 to 10 mm.

Figure 7:
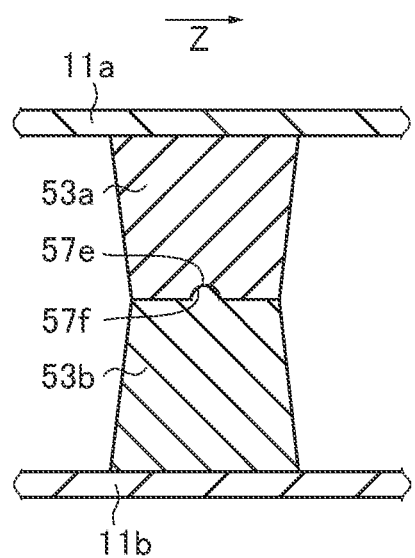
FIG. 7 is a diagram showing a cross-sectional shape of a linear protrusion according to a variation.
Figure 8:
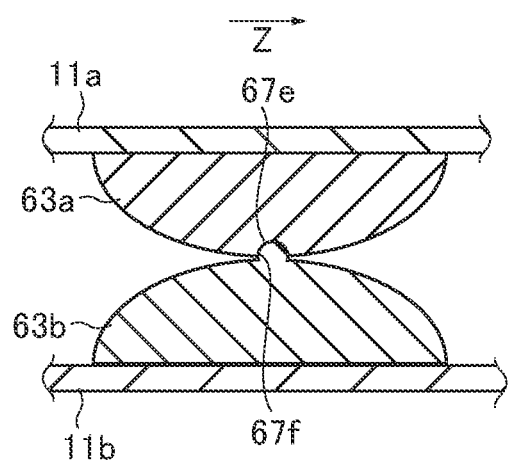
FIG. 8 is a diagram showing a cross-sectional shape of a linear protrusion according to a variation.
Figure 9:
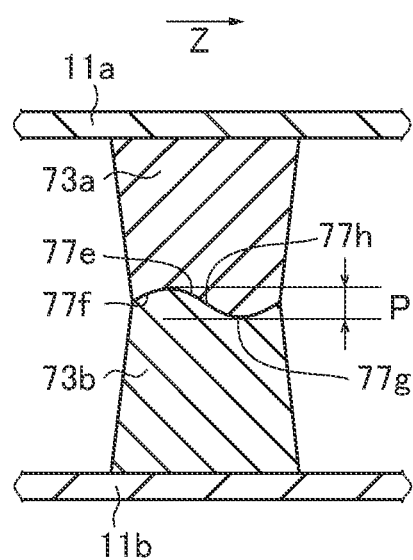
FIG. 9 is a diagram showing a cross-sectional shape of a linear protrusion according to a variation.

Here, other variations of the spacing members will be described with reference to FIGS. 7 to 9. FIGS. 7 to 9 show cross-sectional shapes of spacing members according to the variations.

According to one embodiment, as shown in FIG. 7, it is preferable that a surface of a first spacing member 53b of spacing members 53a and 53b that comes into contact with a second spacing member 53a further includes a protruding portion 57e that is surrounded (sandwiched) by a flat surface 57a and protrudes from the flat surface 57a in a direction away from the filter medium 11, and a surface of the second spacing member 53a that comes into contact with the first spacing member 53b includes a recessed portion 57f that is surrounded (sandwiched) by a flat surface 57a and receives the protruding portion 57e. In this embodiment, in a state where the spacing members 53a and 53b are in contact with each other, the protruding portion 57e and the recessed portion 57f are engaged with each other and the spacing members 53a and 53b restrict each other. Therefore, even if an external force including a component that presses the spacing members 53a and 53b against each other acts on the filter pack, the spacing members do not slide sideways and are not displaced from each other. As a result, the distance between pleats is stably maintained. The protruding portion 57e and the recessed portion 57f may extend along the extending direction of the spacing members 53a and 53b, or may be provided at a plurality of positions that are spaced from each other along the extending direction of the spacing members 53a and 53b, or the protruding portion 57e and the recessed portion 57f may be each provided only at a single position in the extending direction of the spacing members 53a and 53b.

According to one embodiment, as shown in FIGS. 8 and 9, it is preferable that a surface of a first spacing member of spacing members that comes into contact with a second spacing member includes a protruding portion that protrudes in a direction away from the filter medium 11, and a surface of the second spacing member that comes into contact with the first spacing member includes a recessed portion that receives the protruding portion. Contact surfaces of spacing members shown in FIGS. 8 and 9 do not include the flat surface described above. The spacing members shown in FIGS. 8 and 9 may extend linearly in a direction that is orthogonal to the folds 10a and 10b, and a configuration is also possible in which the spacing members do not extend linearly. In the case where the spacing members do not extend linearly, the spacing members may be provided at a plurality of positions along the direction that is orthogonal to the folds 10a and 10b or may be each provided only at a single position. Spacing members that are provided at the plurality of positions each serve as one of paired spacing members. In this embodiment as well, the protruding portion and the recessed portion are engaged with each other and the spacing members restrict each other in a state where the spacing members are in contact with each other. Therefore, even if an external force including a component that presses the spacing members against each other acts on the filter pack, the spacing members do not slide sideways and are not displaced from each other. As a result, the distance between pleats is stably maintained.

In the example shown in FIG. 8, contact surfaces of spacing members 63a and 63b have curved shapes that have cross-sectional contours such as elliptical arcs or circular arcs except for the protruding portion 67e and the recessed portion 67f.

In the example shown in FIG. 9, contact surfaces of spacing members 73a and 73b each include a protruding portion and a recessed portion that are adjacent to each other. More specifically, the spacing member 73a includes a protruding portion 77g and a recessed portion 77f, and the spacing member 73b includes a recessed portion 77h that receives the protruding portion 77g and protruding portion 77e that is received by the recessed portion 77f. A configuration is also possible in which protruding portions and recessed portions are provided in each of the spacing members 73a and 73b so as to be adjacent to each other in the extending direction of the spacing members 73a and 73b. That is, a plurality of protruding portions and a plurality of recessed portions may also be provided in each of the spacing members 73a and 73b.

In the examples shown in FIGS. 7 to 9, in a direction that is orthogonal to the Z direction, a distance (indicated with a reference sign Pin FIG. 9) between a position at which a protruding height of the protruding portion from the extension portion 11a is maximum and a position at which the depth of the recessed portion that is adjacent to the protruding portion is maximum is 0.5 to 3 mm, for example.

It is conventionally known to perform embossing, instead of using spacing members, to provide extension portions with protrusions that come into contact with each other when the pleated filter medium is folded, in order to maintain the distance between pleats of the filter medium. However, in a case where the fiber body constituting the filter medium is made of fiber (e.g., glass fiber) other than organic fiber, if embossing is performed, fibers of the fiber body are broken depending on the height of the protrusions, or the distance between the fibers increases, and there is a risk of collecting performance of the filter medium degrading. In contrast, in the variations shown in FIGS. 7 to 9, the distance between pleats is maintained using the spacing members, and therefore damage to the filter medium such as breakage of fibers does not occur. Therefore, the material of fibers of the fiber body can be selected without limitation.

According to one embodiment, ends of the spacing members 13a and 13b on the fold 10a side and the fold 10b side in the extending direction are preferably arranged such that there is a space G between the ends and the folds 10a and 10b as shown in FIGS. 1 and 2. If the spacing members 13a and 13b are provided across the folds 10a and 10b so as to intersect with the folds 10a and 10b, when the filter medium 11 is folded, the spacing members 13a and 13b are bent or the cross-sectional shapes are deformed, and airflows along the spacing members 13a and 13b are likely to be hindered. In this embodiment, it is possible to suppress a situation in which a mountain-folded portion or a valley-folded portion of the filter medium 11 deforms so as to bulge toward both sides of the fold 10a or 10b as a result of portions of the filter medium 11 that are bonded to the bottom surfaces 17b of the spacing members 13a and 13b in the vicinity of the fold 10a or 10b being pulled by the spacing members 13a and 13b, and it is easy to form the V-shape with the extension portions 11a and 11b. Also, as a result of the spacing members 13a and 13b being spaced apart from the folds 10a and 10b, the filter medium 11 can be easily folded although the spacing members 13a and 13b are in the solidified state. Furthermore, the area of contact between the filter medium 11 and the spacing members 13a and 13b is reduced, and consequently the filter medium area is increased and the lifetime of the filter medium 11 is increased.

According to one embodiment, lengths of the spacing members 13a and 13b in the extending direction preferably differ from each other as shown in FIG. 2, from the standpoint of making it easy to form the V-shape with the extension portions 11a and 11b.

In the example shown in FIG. 2, a length L1 of the spacing member 13a along a direction that is orthogonal to the fold 10a is shorter than a length L2 of the spacing member 13b. Furthermore, according to one embodiment, it is preferable that, in a state where the filter medium 11 is folded, a leading end portion 13c of the spacing member 13b that extends toward the valley fold 10b is in contact with the extension portion 11a in a valley-folded portion of the filter medium 11, and the spacing member 13b is in contact with the spacing member 13a at an intermediate position 13d in the extending direction of the spacing member 13b, as in the example shown in FIG. 2.

As a result of the spacing members 13a and 13b being in contact with each other as described above, the distance between pleats of the filter medium 11 is maintained. Furthermore, the leading end portion 13c of the spacing member 13b is in contact with both of the extension portions 11a and 11b that form the valley-folded portion of the filter medium 11 on the fold 10b side (valley side), and the paired spacing members 13a and 13b are in contact with each other on the fold 10a side (mountain side), and therefore the distance between the extension portions 11a and 11b is longer on the mountain side than on the valley side. With this configuration, the extension portions 11a and 11b forming the valley-folded portion are unlikely to face each other in parallel to each other due to an airflow passing through the filter medium 11, and accordingly, the extension portions 11a and 11b are unlikely to form a U-shape and it is easy to maintain the V-shape that is open from the valley side toward the mountain side. If the V-shape is maintained in the filter medium 11, an airflow easily passes through the filter medium 11 and an increase in the pressure loss is suppressed. In particular, as a result of the leading end portion 13c of the spacing member 13b being in contact with both of the extension portions 11a and 11b, even if a force is applied in a direction that reduces the distance between pleats, the distance between the two mutually facing extension portions is maintained, and the distance between pleats is kept constant. Therefore, the filter pack is unlikely to include a portion in which an airflow is hindered, and an increase in the pressure loss is suppressed.

Also, in this embodiment, the spacing member 13a is shorter than the spacing member 13b as described above, and the area of contact between the filter medium 11 and the spacing members 13 is reduced. That is, an area of the filter medium 11 through which an airflow does not pass and that does not contribute to collecting fine particles is reduced. Therefore, an effect of reducing the pressure loss can be achieved according to this embodiment.

The length L1 of the spacing member 13a is 10% to 40% of a length (hereinafter also referred to as a "folding width") between adjacent folds 10a and 10b, for example.

The length L2 of the spacing member 13b is 50% to 80% of the folding width of the filter medium 11, for example. Also, the leading end portion 13c of the spacing member 13b is preferably located within a range of 90% or less of the folding width of the filter medium 11 from the fold 10a, and preferably within a range of 80% or less of the folding width of the filter medium 11. As a result of a leading end position of the leading end portion 13c being spaced apart from the fold 10b as described above, the area of the filter medium 11 through which an airflow does not pass can be reduced. The filter pack 3 according to this embodiment forms the V-shape that includes only one fold in a vertex portion (a valley-folded portion or a mountain-folded portion) of a pleat and has an edge, and therefore an angle formed between the two mutually facing extension portions 11a and 11b can be easily increased and the above-described effect of increasing the distance between pleats is enhanced, when compared to a filter pack that has a cross-sectional shape including two folds in a vertex portion of a pleat. In the filter pack 3 having the V-shape including only one fold in the vertex portion of a pleat, the leading end portion 13c can come into contact with both of the extension portions 11a and 11b even if the leading end portion 13c is arranged at a position spaced apart from the fold 10b.

According to one embodiment, a ratio L1/L2 between L1 and L2 is preferably 0.1 to 0.5. In this case, it is possible to increase a distance between a position at which the spacing member 13b comes into contact with the extension portion 11a and a position at which the spacing members 13a and 13b come into contact with each other, and it is easy to stably maintain the V-shape of the filter medium 11.

According to one embodiment, the position 13d at which the spacing members 13a and 13b come into contact with each other is preferably closer to the mountain fold 10a than the valley fold 10b. If the contact position between the spacing members 13a and 13b is on the mountain side, the V-shape can be stably maintained. Also, if leading ends of the spacing members 13a and 13b are located on the mountain side, the area of the filter medium 11 through which an airflow does not pass can be reduced and the effect of reducing the pressure loss is enhanced, when compared to a case where the leading end of the spacing member 13a is located on the valley side. Also, the V-shape is stably maintained, and therefore the increased distance between pleats can be stably maintained. Note that, in terms of enhancing the effect of increasing the distance between pleats, the spacing member 13a is preferably located on the mountain side, at a position toward the valley side. Also, the leading end portion 13c of the spacing member 13b is preferably located on the valley side. Note that the "mountain side" refers to the fold 10a side with respect to a middle point of a line segment that connects the folds 10a and 10b. The "valley side" refers to the fold 10b side with respect to the middle point.

According to one embodiment, the spacing member 13a is located within a range of a length of 10% to 40% of the folding width of the filter medium 11 from the fold 10a, for example, preferably within a range of a length of 10% or more and less than 30% of the folding width, and more preferably within a range of a length of 20% or more and less than 30% of the folding width.

Also, according to one embodiment, the spacing member 13b is located within a range of a length of 10% to 80% of the folding width of the filter medium 11 from the fold 10a, for example, and preferably within a range of a length of 10% or more and less than 70% of the folding width.

According to one embodiment, as shown in FIG. 2, the spacing members 13 preferably further include spacing members 13e and 13f that are formed on a downstream side surface of the filter medium 11 that is opposite to an upstream side surface of the filter medium 11 on which the above-described spacing members 13a and 13b are arranged, the spacing members 13e and 13f being formed so as to linearly extend orthogonally to the fold 10b at positions that are the same as the positions of the spacing members 13a and 13b in the direction (Z direction) in which the fold 10a extends. A length L3 of the spacing member 13e in an extending direction thereof is preferably shorter than a length L4 of the spacing member 13f in an extending direction thereof as shown in FIG. 2, but may also be longer than the length L4.

In this case, it is preferable that the spacing member 13e is formed at a position at which the spacing member 13e and the leading end portion 13c of the spacing member 13b sandwich the extension portion 11a, and the spacing member 13f is formed at a position at which the spacing member 13f and the spacing member 13b sandwich the extension portion 11b. If the spacing member 13e is arranged as described above relative to the leading end portion 13c of the spacing member 13b, the extension portion 11a is supported from the downstream side when an airflow passes. Therefore, it is possible to suppress a situation in which a U-shape is formed as a result of the valley-folded portion being deformed so as to bulge toward the downstream side.

Also, the leading end portion 13c of the spacing member 13b is sandwiched and restricted between the spacing members 13e and 13f, and therefore the leading end portion 13c of the spacing member 13b is stably located at a center position of the V-shape, and this enhances the effect of making it easy to maintain the V-shape and the effect of increasing the distance between pleats.

In the case where the spacing members 13 further include the spacing members 13e and 13f as described above, according to one embodiment, the length L3 of the spacing member 13e along the direction orthogonal to the folds 10a and 10b is preferably shorter than the length L4 of the spacing member 13f.

If both of the spacing members 13a and 13e having short lengths in the extending direction are arranged in the extension portion 11a and both of the spacing members 13b and 13f having long lengths in the extending direction are arranged in the extension portion 11b, areas in which spacing members located on both surfaces of the filter medium 11 overlap each other are increased as shown in FIG. 2. Therefore, it is possible to suppress an increase in the area of the filter medium 11 through which an airflow does not pass. An airflow cannot pass even if a spacing member is only formed on one surface of the filter medium, and therefore it is preferable that spacing members are located on both surfaces of the filter medium 11 so as to overlap each other as described above. According to one embodiment, the spacing members 13a and 13e located on both surfaces of the extension portion 11a are preferably spaced apart from each other in the direction orthogonal to the folds 10a and 10b, and are spaced apart from each other by a distance of 10% to 30% of the folding width of the filter medium 11, for example.

According to one embodiment, the flat surface 17a of each of the spacing members 13a and 13b is preferably formed in a region having a length of 20% or more, preferably 50% or more, and more preferably 100% of the length of the spacing member 13a or 13b in the extending direction thereof. If the flat surface 17a of each of the spacing members 13a and 13b is formed in the above-described region, the distance between pleats can be more stably maintained when the spacing members slide sideways and are displaced, even if the filter medium 11 is deformed such that the extension portions 11a and 11b form a U-shape due to the magnitude of pressure of an airflow that passes through the filter medium 11, and the spacing members 13a and 13b come into linear contact with each other across the extending direction, for example.

Pairs of the spacing members 13a and 13b are arranged at 4 to 20 positions along the direction (Z direction) of the folds 10a and 10b, for example.

The frame body 5 is a member that surrounds the filter pack 3 such that the folds 10a and 10b of the filter medium 11 are arranged on the upstream side and the downstream side of an airflow direction. In the example shown in FIG. 1, the folds 10a of the filter medium 11 are arranged on the upstream (direction opposite to the X direction) side. The frame body 5 is a rectangular member, for example. The frame body 5 is formed by combining frame materials such as galvanized iron plates, stainless steel plates, or resin, for example. The air filter 1 is assembled such that there is no gap between the filter pack 3 and the frame body 5 by fixing both ends of the filter pack 3 in the Z direction to the frame body 5 using a sealing agent such as urethan resin, for example, and fixing both ends of the filter pack 3 in the Y direction to the frame body 5 using adhesives that linearly extend in the Z direction.

As described above, according to the present embodiment, contact surfaces of paired spacing members of spacing members each include a flat surface that extends in the direction orthogonal to the direction in which the spacing members face each other, and therefore the pleated filter medium 11 can be easily folded and the distance between pleats of the filter medium 11 can be stably maintained. Also, the pleated filter medium 11 can be easily folded and the distance between pleats of the filter medium 11 can be stably maintained with a configuration in which paired spacing members of spacing members include the protruding portion and the recessed portion described above.

Also, according to the present embodiment, the spacing members 13a and 13b each include the flat surface 17a and are in the solidified state, and therefore the filter medium area is not reduced and a reduction in the lifetime of the filter medium 11 can be suppressed.

Example and Comparative Example

A filter medium that was obtained through papermaking using glass fiber and had a collecting efficiency of 90% was pleated by alternately performing mountain folding and valley folding at intervals of 125 mm using a rotary folding machine. With respect to each mountain fold of the filter medium, a heated and softened hot-melt adhesive was transferred along a direction that was orthogonal to the fold at a plurality of positions that were spaced from each other in a direction in which the fold extended, to provide spacing members that had the cross-sectional shape shown in FIG. 3 in each of extension portions on both sides of each mountain fold in both surfaces of the filter medium as shown in FIG. 2, and thus a filter pack was manufactured (example).

A filter pack was manufactured similarly to the example in all aspects other than that the hot-melt adhesive was directly applied to the filter medium 11 so as to intersect with the folds 10a and 10b of the filter medium 11 using a gun that was loaded with the heated and softened hot-melt adhesive, instead of providing spacing members using the transfer method, and the spacing members had the cross-sectional shape shown in FIG. 6 (comparative example). Note that FIG. 6 is a diagram showing the cross-sectional shape of the spacing members 43a and 43b according of the comparative example.

Configurations of the spacing members according to the example and the comparative example are shown in Table 1 below.

In Table 1, base angles α and β in the comparative example are angles formed between the bottom surface 47b and tangential lines at positions of contact with the filter medium 11.

As for the "length of spacing members in extending direction" in the example, the length of the spacing members 13a and 13e in the extending direction was set to 32.5 mm, and the length of the spacing members 13b and 13f in the extending direction was set to 90 mm.

TABLE 1

| | Example | Comparative example |
|---|---|---|
| Width W1 (mm) of flat surface | 2 | — |
| Width W2 (mm) of bottom surface | 4 | 2 |
| Height H (mm) of flat surface | 3.5 | 1.75 |
| W1/W2 | 0.5 | — |
| H/W2 | 0.875 | 0.875 |
| Space G (mm) | 7 | — |

TABLE 1-continued

|  | Example | Comparative example |
|---|---|---|
| Base angles α and β (degrees) | 73 | 140 |
| Length (mm) of spacing members in extending direction | 32.5, 90 | 12 |

Next, the filter packs of the example and the comparative example were each surrounded by a frame material made of SGCC (JIS G 3302), and a frame body was assembled by sealing gaps between the frame body and the filter medium using a sealing agent and an adhesive, and thus an air filter was manufactured. In each of the example and the comparative example, the filter medium was folded after the hot-melt adhesive was solidified.

A pressure loss at the time when air was passed through the manufactured air filter at a rate of 56 m$^3$/minute was measured using a differential pressure gauge, and the pressure loss was 118 Pa in the example and was 130 Pa in the comparative example. From this result, it was found that the pressure loss could be reduced as a result of contact surfaces of paired spacing members of spacing members each had the flat surface 17a that extended in the direction orthogonal to the direction in which the spacing members faced each other.

Although details of the air filter and the filter pack according to the present invention have been described, the air filter and the filter pack according to the present invention are not limited to the embodiment described above, and various improvements and changes can of course be made within a range not departing from the gist of the present invention.

What is claimed is:

1. A filter pack comprising:
 a filter medium configured to collect fine particles in a gas, the filter medium having pleating with mountain folded portions and valley folded portions configured such that mountain folds and valley folds are alternately repeated; and
 a plurality of spacing members that maintain a distance between adjacent mountain-folded portions or adjacent valley-folded portions of the filter medium, and are each formed of a thermoplastic resin adhesive that is in a solidified state,
 the filter medium including two extension portions that extend to both sides of folds of the filter medium that are formed through the pleating, the extension portions facing each other in a state in which the filter medium is folded,
 the plurality of spacing members including paired spacing members that are respectively provided on the extension portions so as to be adhered to the folds and linearly extend in a direction that is orthogonal to the folds,
 the paired spacing members being in contact with each other in the state in which the filter medium is folded,
 surfaces of the paired spacing members that come into contact with each other each including a flat surface that extends in a direction that is orthogonal to a direction in which the spacing members face each other when viewed along an extending direction of the spacing members, and
 in a direction that is parallel to an extending direction of the flat surface, a ratio W1/W2 being 0.3 to 0.9, with W1 being a width of the flat surface and W2 being a width of a bottom surface of the paired spacing member that is in contact with the filter medium.

2. The filter pack according to claim 1, wherein
 when viewed along the extending direction of the spacing members, a width of each of the spacing members along a direction that is parallel to an extending direction of the flat surface of the spacing member is maximum at a bottom surface of the spacing member that is in contact with the filter medium.

3. The filter pack according to claim 2, wherein
 in a direction that is parallel to the extending direction of the flat surface, a located position of the flat surface is within a range of a located position of the bottom surface, and
 the width of the spacing member that includes the flat surface becomes shorter in a direction away from the bottom surface.

4. The filter pack according to claim 1, wherein
 the paired spacing members each further includes two flat side surfaces that each connect an end of a bottom surface of the spacing member that is in contact with the filter medium and an end of the flat surface, the ends being disposed along a direction that is parallel to an extending direction of the flat surface.

5. A filter pack comprising:
 a filter medium configured to collect fine particles in a gas, the filter medium having pleating with mountain folded portions and valley folded portions configured such that mountain folds and valley folds are alternately repeated; and
 a plurality of spacing members that maintain a distance between adjacent mountain-folded portions or adjacent valley-folded portions of the filter medium, and are each formed of a thermoplastic resin adhesive that is in a solidified state,
 the filter medium including two extension portions that extend to both sides of folds of the filter medium that are formed through the pleating, the extension portions facing each other in a state in which the filter medium is folded,
 the plurality of spacing members including paired spacing members that are respectively provided on the extension portions so as to be adhered to the folds and linearly extend in a direction that is orthogonal to the folds,
 the paired spacing members being in contact with each other in the state in which the filter medium is folded,
 surfaces of the paired spacing members that come into contact with each other each including a flat surface that extends in a direction that is orthogonal to a direction in which the spacing members face each other when viewed along an extending direction of the spacing members, and
 a ratio H/W2 being larger than 0.5, with H being a height of the flat surface with respect to a bottom surface of the paired spacing member that is in contact with the filter medium and W2 being a width of the bottom surface in a direction that is parallel to an extending direction of the flat surface.

6. The filter pack according to claim 1, wherein
 ends of the paired spacing members on a fold side along the extending direction of the spacing members are spaced apart from the fold.

7. The filter pack according to claim 1, wherein
 a surface of a first spacing member of the paired spacing members that comes into contact with a second spacing member further includes a protruding portion that is surrounded by the flat surface of the first spacing member and protrudes from the flat surface in a direction away from the filter medium, and a surface of the second spacing member that comes into contact with the first spacing member further includes a recessed portion that is surrounded by the flat surface of the second spacing member and receives the protruding portion.

8. An air filter including the filter pack according to claim 1, the air filter further comprising:

a frame body surrounding the filter pack such that folds of the filter medium of the filter pack are arranged on an upstream side and a downstream side of a direction in which an airflow passes through the filter medium.

9. The filter pack according to claim 2, wherein the paired spacing members each further includes two flat side surfaces that each connect an end of a bottom surface of the spacing member that is in contact with the filter medium and an end of the flat surface, the ends being disposed along a direction that is parallel to an extending direction of the flat surface.

10. The filter pack according to claim 2, wherein a ratio H/W2 is larger than 0.5, with H being a height of the flat surface with respect to a bottom surface of the paired spacing member that is in contact with the filter medium and W2 being a width of the bottom surface in a direction that is parallel to an extending direction of the flat surface.

11. The filter pack according to claim 2, wherein ends of the paired spacing members on a fold side along the extending direction of the spacing members are spaced apart from the fold.

12. The filter pack according to claim 2, wherein a surface of a first spacing member of the paired spacing members that comes into contact with a second spacing member further includes a protruding portion that is surrounded by the flat surface of the first spacing member and protrudes from the flat surface in a direction away from the filter medium, and a surface of the second spacing member that comes into contact with the first spacing member further includes a recessed portion that is surrounded by the flat surface of the second spacing member and receives the protruding portion.

13. The filter pack according to claim 4, wherein a ratio H/W2 is larger than 0.5, with H being a height of the flat surface with respect to a bottom surface of the paired spacing member that is in contact with the filter medium and W2 being a width of the bottom surface in a direction that is parallel to an extending direction of the flat surface.

14. The filter pack according to claim 4, wherein ends of the paired spacing members on a fold side along the extending direction of the spacing members are spaced apart from the fold.

15. The filter pack according to claim 4, wherein a surface of a first spacing member of the paired spacing members that comes into contact with a second spacing member further includes a protruding portion that is surrounded by the flat surface of the first spacing member and protrudes from the flat surface in a direction away from the filter medium, and a surface of the second spacing member that comes into contact with the first spacing member further includes a recessed portion that is surrounded by the flat surface of the second spacing member and receives the protruding portion.

16. The filter pack according to claim 5, wherein the ratio H/W2 is larger than 0.8.

17. The filter pack according to claim 1, wherein the paired spacing members include two curved side surfaces that connect respective ends of the bottom surface and the flat surface, the ends ending in a direction that is parallel to an extending direction of the flat surface, in a cross-sectional shape of the spacing member viewed from the extending direction of the spacing member, each of the curved side surfaces has a shape bulging toward a center of the cross-sectional shape of the spacing member when compared to flat surfaces that connect the respective ends of the bottom surface and the flat surface.

* * * * *

UNITED STATES PATENT AND TRADEMARK OFFICE
CERTIFICATE OF CORRECTION

PATENT NO. : 12,157,085 B2
APPLICATION NO. : 17/286417
DATED : December 3, 2024
INVENTOR(S) : Hirokazu Izumiya et al.

It is certified that error appears in the above-identified patent and that said Letters Patent is hereby corrected as shown below:

On the Title Page

Item (72) delete "(72) Hirokazu Izumiya, Yuki (JP); Osamu Kitagawa, Yuki (JP); Shiro Hayashi, Yuki (JP)" and insert -- (72) Hirokazu Izumiya, Yuki (JP); Osamu Kitayama, Yuki (JP); Shiro Hayashi, Yuki (JP) --

Signed and Sealed this
Thirteenth Day of May, 2025

Coke Morgan Stewart
*Acting Director of the United States Patent and Trademark Office*